United States Patent Office 2,850,510
Patented Sept. 2, 1958

2,850,510
ANTHRAQUINONE DYESTUFFS

Milton L. Hoefle, Roseville, Mich., and David I. Randall, Easton, Pa., assignors to General Aniline & Film Corporation, New York, N. Y., a corporation of Delaware No Drawing. Application August 4, 1954
Serial No. 447,884

9 Claims. (Cl. 260—373)

This invention relates to the production of a new series of anthraquinone dyestuffs and more particularly to unsulfonated compounds having the following general formula:

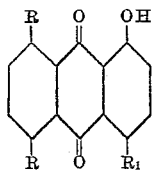

wherein one R is OH and the other R is

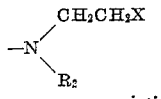

$R_1$ is selected from the group consisting of

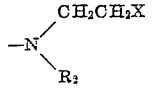

and

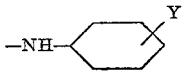

$R_2$ is selected from the group consisting of lower alkyl and $-CH_2CH_2X$, X is selected from the group consisting of $-OH$, $-CN$ and $-CONH_2$ and Y is a substantivity-increasing radical.

The problem of providing acid gas resistant dyestuffs in the blue range for cellulose acetate rayon fibers and other fibrous material having a basis of polymeric material has long been recognized. Other properties highly desirable in such dyestuffs include fastness to light and to washing in addition to good substantivity for the fiber. It has been found that dyestuffs of the above formula provide a series of blue shaded colors on film, fibrous and other material which have surprisingly good light-, wash-, and acid gas fastness properties and a good substantivity for the material to be colored. In addition to cellulose acetate, the dyestuffs of this invention may be employed for coloring other natural and synthetic polymeric material in bulk, film or fiber form, including polyamides, polyesters and polyacrylonitriles and the like, such as nylon, Orlon, Dacron, Acrilan, Dynel and the like.

In the formula given above, the substantivity-increasing radical Y is preferably hydroxyalkyl such as hydroxy methyl, hydroxy ethyl and the like, acidylamino such as acetamido, N-methyl acetamido, and the like, or sulfonamido, i. e., $SO_2ND_1D_2$, wherein $D_1$ and $D_2$ may be hydrogen, alkyl, hydroxyalkyl, hydroxy alkoxy alkyl, hydroxy polyalkoxy alkyl, cyanoalkyl, and, when taken together, part of a 5 to 7 membered heterocyclic ring, the alkyl groups having from 1 to 3 carbon atoms, e. g. methyl,, ethyl, propyl or isopropyl. However, other substantivity-increasing radicals may be employed, as for example, hydroxy ethoxy, hydroxyethoxy ethyl, hydroxy ethoxy methyl, hydroxy polyethoxy ethyl, and the like. $R_2$ may, in addition to being $-CH_2CH_2X$, be methyl, ethyl, propyl, isopropyl, or the like. The preferred compounds of this invention are those wherein $R_1$ is an aryl amino radical containing a substantivity-increasing radical and X is $-CN$ or $-CONH_2$. In such compounds, a sulfamyl substantivity-increasing radical has been found to give greatly improved results.

The dyestuffs of this invention may be readily prepared in diverse manner by condensation of the proper components, if desired in the presence of catalysts and acid binding agents and in an inert inorganic or organic solvent or diluent such as o-dichlorobenzene, quinoline, pyridine or the like. For example, the nitro groups in 4,8-dinitroanthrarufin or 4,5-dinitrochrysazine or a mixture of these two compounds may be selectively replaced, one nitro being replaced by treatment with two molar equivalents of an appropriately substituted arylamine of the formula:

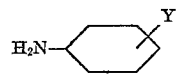

followed by replacement of the second nitro group by reaction with two molar equivalents of an appropriately substituted secondary amine of the formula

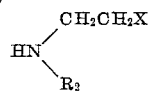

wherein $R_2$, X and Y have the values given above. In another modification, both nitro groups in the said dinitroanthrarufin and/or dinitrochrysazine may be replaced by treatment with an appropriately substituted secondary amine of the above depicted formula to produce dyestuffs having excellent gas fastness properties on cellulose acetate rayon and good substantivity to Dacron and the like. Alternatively, the desired dyestuffs may be prepared by condensing the appropriate substituted arylamine and/or secondary amine of the above-depicted formulae with anthrarufin and/or chrysazine containing other negative radicals in the free alpha positions such as halogen, or the like by the methods usually employed in the preparation of arylamino- and alkylamino anthraquinones. In still another modification, an anthraquinone in an intermediate stage of condensation may be employed as for example 1-hydroxyanthraquinone containing a properly substituted arylamino group in the 4-position and hydroxy and nitro groups in the 5- and 8-position. Replacement of the nitro group in such an intermediate condensation product by reaction with an appropriately substituted secondary amine of the above-depicted formula will yield the desired dyestuffs of this invention.

The following examples, in which parts are by weight unless otherwise indicated, will serve to illustrate the invention, but they are not intended to limit it thereto.

*Example 1*

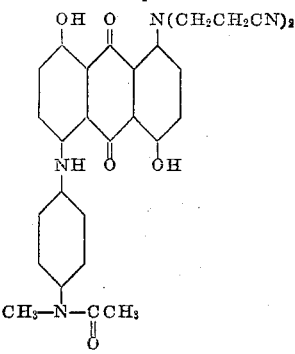

Into a reaction vessel equipped with a thermometer, stirrer and reflux condenser were charged 6.0 parts p-(4,8-dihydroxy-5-nitro-1-anthraquinonyl)-N-methylacetanilide, 6.0 parts β,β'-iminodipropionitrile and 45 parts o-dichlorobenzene. The reaction mixture was heated at reflux (168–170° C.) for six hours. The reaction mixture was then steam distilled, and the solid product was removed by filtration and washed with hot water. The product was oven dried and weighed 6.1 parts. This product dyed acetate rayon in red-blue shades of excellent gas fastness.

Example 2

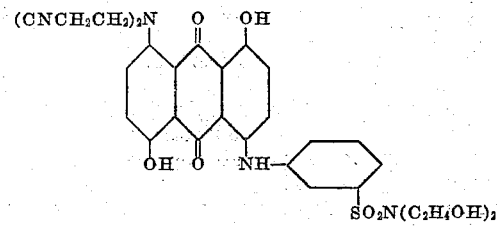

Into a reaction flask equipped with stirrer, condenser and thermometer were charged 4.4 parts N³-(4,8-dihydroxy-5-nitro-1-anthraquinonyl)-N'-bis(2-hydroxyethyl)-metanilamide, 6.0 parts β,β'-iminodipropionitrile, 40 parts o-dichlorobenzene. The reaction mixture was heated at reflux for six hours, then steam distilled. The solid product was removed by filtration and dried in an oven, yielding 3.2 parts of product which dyed acetate rayon in blue shades which proved to be exceptionally fast to the action of combustion gas fumes.

Example 3

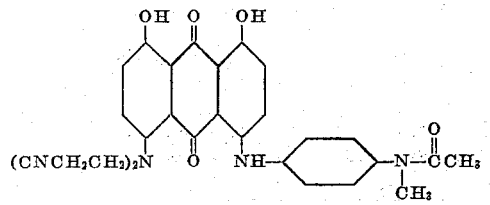

Into a reaction flask equipped with condenser, thermometer and stirrer were charged 4.0 parts p-(4,5-dihydroxy-8-nitro-1-anthraquinonyl)-N-methylacetanilide, 7.5 parts β,β'-iminodipropionitrile and 40 parts o-dichlorobenzene. This reaction mixture was heated at reflux for 6 hours, and then steam distilled in order to remove the solvent. The solid product was collected by filtration and washed with hot water. Upon drying, 3.0 parts product were obtained which dyed acetate rayon in blue shades possessing excellent light and almost perfect gas fastness.

Example 4

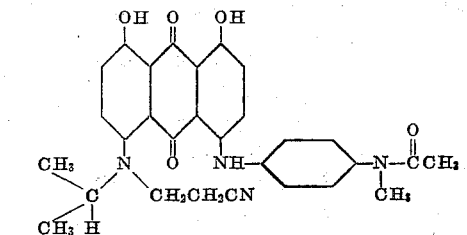

and

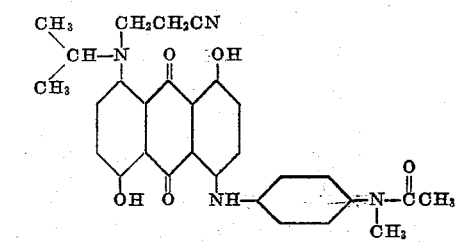

Into a reaction flask equipped with stirrer, thermometer and reflux condenser were charged 4.0 parts condensation product of p-amino-N-methylacetanilide and a mixture of 4,5-dinitrochrysazine and 4,8-dinitro anthrarufin, 8.0 parts β-isopropylaminopropionitrile, and 40.0 parts o-dichlorobenzene. The reaction mixture was heated at reflux for eight hours. It was then steam distilled, and the solid was removed by filtration and washed with warm water. The product was dried in an oven and weighed 3.1 parts. This product dyed acetate rayon in blue shades possessing excellent gas fastness.

Example 5

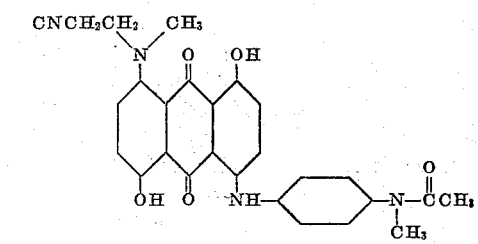

and

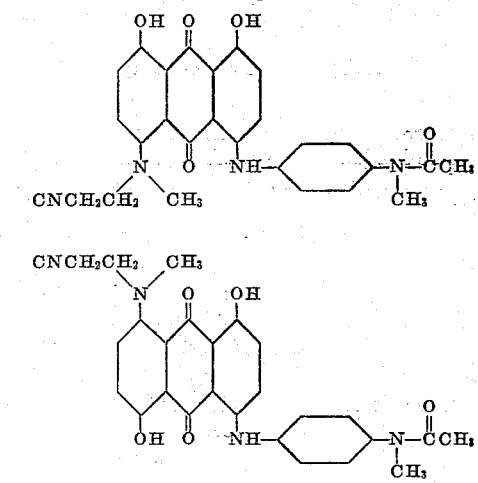

The procedure of Example 4 was repeated except that the β-isopropylaminopropionitrile was replaced by 6.0 parts β-methylaminopropionitrile. The resulting product dyed acetate rayon in blue shades which possessed excellent gas fastness.

Example 6

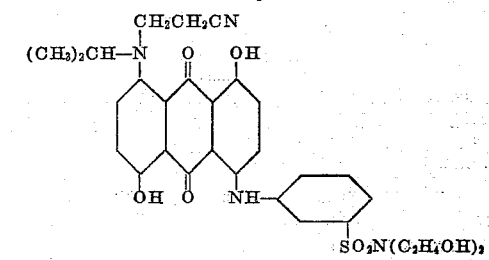

Into a reaction vessel equipped with a stirrer, thermometer and reflux condenser were charged 3.0 parts N³-(4,8-dihydroxy-5-nitro-1-anthraquinonyl)-N'-bis(2-hydroxyethyl)metanilamide, 6.0 parts β-isopropylaminopropionitrile and 40 parts o-dichlorobenzene. The reaction mixture was heated at reflux for eight hours. The solvent was then removed by steam distillation. The product was removed by filtration and washed with hot water and then dried in an oven, yielding 3.0 parts. This product dyed acetate rayon in blue shades which possessed excellent gas fastness.

Example 7

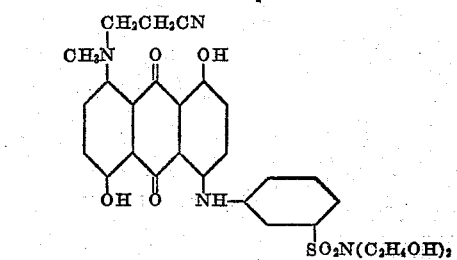

The procedure of Example 6 was repeated except that the β-isopropylaminopropionitrile was replaced by 6.0 parts β-methylaminopropionitrile to yield 2.6 parts of a product which dyed rayon acetate in deep blue shades which possessed excellent gas fastness.

Example 8

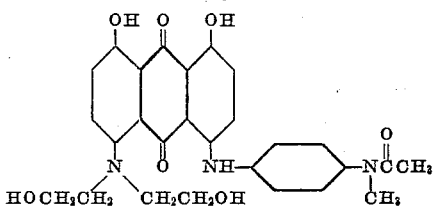

and

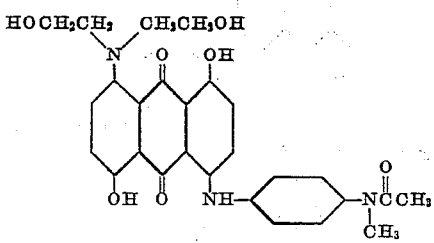

Into a reaction flask equipped with a thermometer, stirrer and condenser were charged 5.0 parts of the condensation product of p-amino-N-methylacetanilide and the mixture of dinitrochrysazine and dinitroanthrarufin, 6.0 parts diethanolamine and 40 parts o-dichlorobenzene. This reaction mixture was heated at reflux for six hours. It was then steam distilled and the product was isolated by filtration. Upon drying 4.0 parts of product were obtained. This product dyed acetate rayon readily in blue shades possessing good light and gas fastness.

Example 9

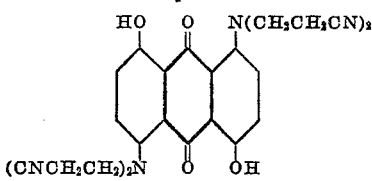

Into a reaction vessel equipped with a stirrer, thermometer and condenser was charged 6.6 parts dinitroanthrarufin, 11.0 parts N-N-iminodipropionitrile, 8.0 parts dimethylaniline and 40 parts o-dichlorobenzene. This reaction mixture was heated at reflux for sixteen hours, and it was then steam distilled and the product was removed by filtration. The product was then suspended in 750 parts water containing 4 parts sodium carbonate and 4 parts sodium bicarbonate. This mixture was stirred at 90–95° C. for thirty minutes and then filtered hot. The product was then oven dried, yielding 6.5 parts which dyed acetate rayon in red-blue shades which possessed excellent light and gas fastness.

Example 10

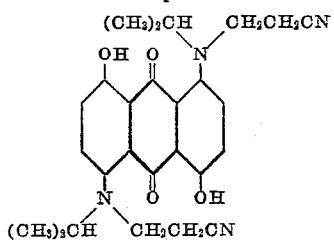

Into a reaction vessel equipped with a stirrer, condenser and thermometer was charged 4.0 parts 4,8-dinitroanthrarufin, 8.0 parts β-isopropylaminopropionitrile and 40 parts o-dichlorobenzene. This reaction mixture was heated at reflux for ten hours. The solvent was removed by steam distillation, and the solid product was collected by filtration and washed with water. The product was powdered and then suspended in hot aqueous sodium hydroxide solution (4%) and leached for one-half hour. The product was then collected on a filter and washed neutral with hot water. Upon drying, 5.1 parts product were obtained which dyed acetate rayon in red-blue shades which possessed good light and gas fastness.

Example 11

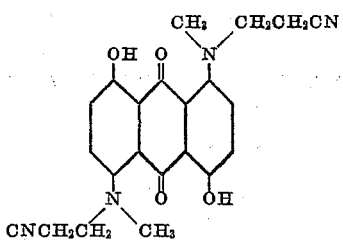

The procedure of Example 10 was repeated except that the isopropylaminopropionitrile was replaced by 8.0 parts β-methylaminopropionitrile and the reaction mixture was heated at reflux for fifteen hours. This reaction mixture was worked up as in the preceding example yielding a product which dyed acetate rayon in red-blue shades of good light and gas fastness.

This invention has been described with respect to several preferred embodiments thereof and various modifications and variations thereof will become obvious to the person skilled in the art. It is to be understood that such modifications and variations are included within the spirit and purview of this application and the scope of the appended claims.

We claim:

1. An unsulfonated compound of the formula

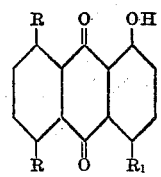

wherein one R is OH and the other R is

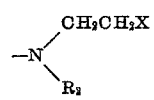

$R_1$ is

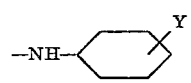

$R_2$ is selected from the group consisting of lower alkyl and —$CH_2CH_2X$, X is selected from the group consisting of —OH, —CN and —$CONH_2$ and Y is a substantivity-increasing radical selected from the group consisting of hydroxyalkyl, acidylamino, and sulfonamido.

2. An unsulfonated compound of the formula

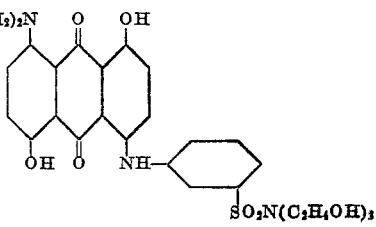

3. An unsulfonated compound of the formula

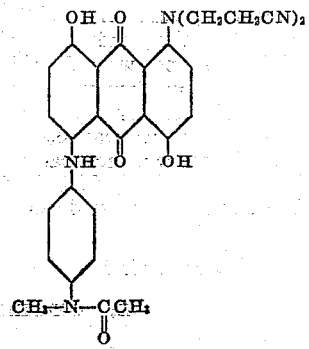

4. An unsulfonated compound of the formula

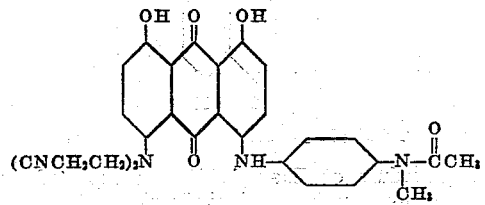

5. An unsulfonated compound of the formula

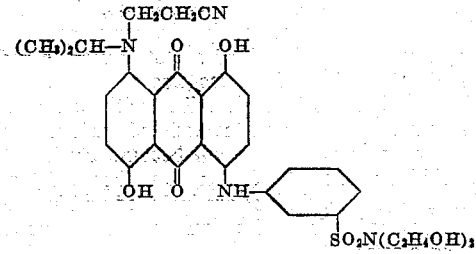

6. An unsulfonated compound of the formula

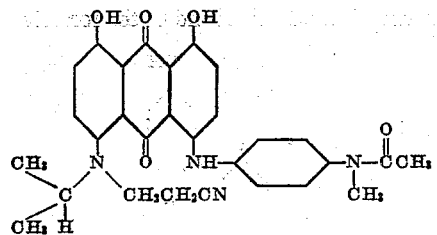

7. An unsulfonated compound of the formula

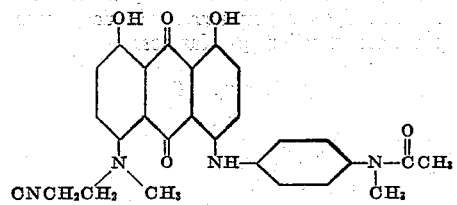

8. An unsulfonated compound of the formula

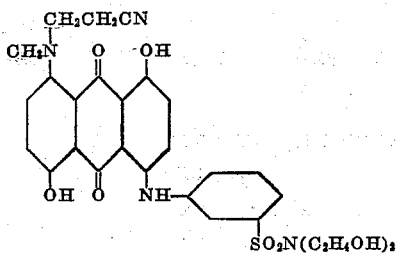

9. An unsulfonated compound of the formula

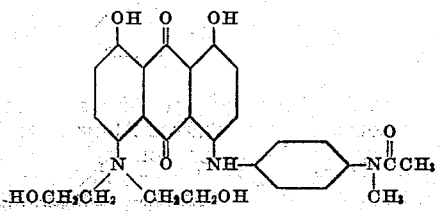

References Cited in the file of this patent

UNITED STATES PATENTS 2,611,722    Allen et al.   ----------  Sept. 23, 1952